June 30, 1942.    A. H. NEULAND    2,288,018
INTERNAL COMBUSTION ENGINE
Filed March 18, 1940    4 Sheets-Sheet 3

INVENTOR.
Alfons H. Neuland

June 30, 1942.  A. H. NEULAND  2,288,018
INTERNAL COMBUSTION ENGINE
Filed March 18, 1940  4 Sheets-Sheet 4

INVENTOR.
Alfons H. Neuland

Patented June 30, 1942

2,288,018

UNITED STATES PATENT OFFICE 2,288,018

INTERNAL COMBUSTION ENGINE

Alfons H. Neuland, Cleveland, Ohio

Application March 18, 1940, Serial No. 324,546

14 Claims. (Cl. 123—70)

This invention relates to internal combustion engines and particularly to engines of the two stroke cycle type, and its object is to provide an improved engine of high efficiency and power, light weight and relatively simple construction.

Generally, my invention resides in a novel construction and arrangement of combustion and induction cylinders and pistons and their association with each other and with cooling means to provide a compact engine in which the combustion cylinders are positively and uniformly charged or supercharged without the aid of auxiliary valves and are effectively cooled without the aid of an external radiator.

One feature of my invention consists of the construction and arrangement of combustion and induction cylinders and pistons, and the connection of the pistons to the cranks of the engine shaft whereby the pistons serve as valves to control charging of the induction cylinder and the effective transfer of the charge or supercharge to the combustion cylinder during or after the exhaust period.

The present application is in part a continuation of my copending applications Serial Numbers 181,086; 313,656 and 314,977, filed on December 22, 1937 and issued on August 6, 1940, bearing Patent No. 2,209,996; January 13, 1940 and January 22, 1940 respectively in which I have disclosed arrangements for impelling a cooling air stream by the exhaust gas. One object of the present invention is to provide an improved construction and arrangement of cooling elements adapted to be cooled by an exhaust impelled air stream.

The foregoing and other objects, features and advantages of my invention will appear in the following description and from the drawings showing a preferred embodiment of my invention and will hereafter be more fully defined in the appended claims.

Figs. 5 to 10 inclusive are diagrammatic views illustrating the valve action of the pistons during each cycle of operation.

Figure 11:
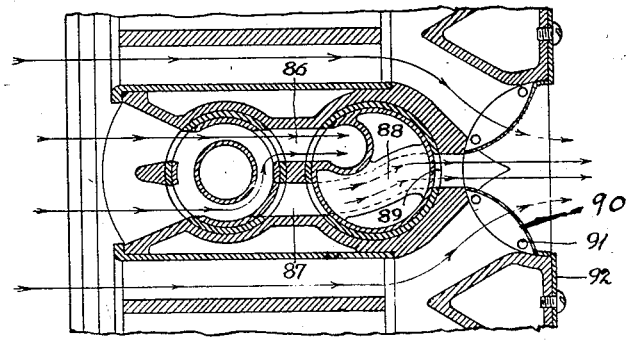

Fig. 11 is a section through a modified arrangement of ports and ducts.

Figure 12:
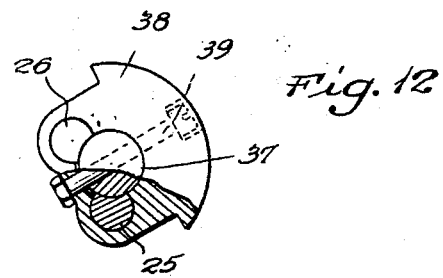

Fig. 12 is a side view of the central crankshaft clamp showing the arrangement of the central plug and crankpin extensions therein as well as the bolts for locking the crankshaft portions together.

Figure 1:
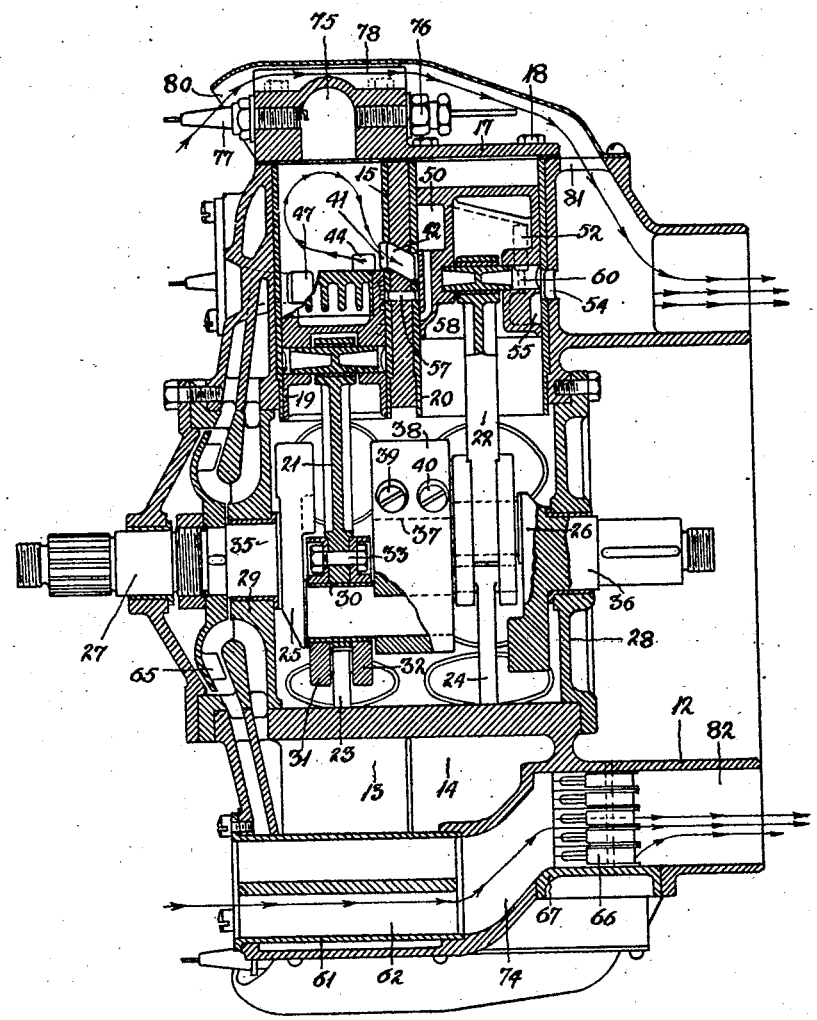
Fig. 1 is a vertical section through an engine embodying my invention.
Figure 2:
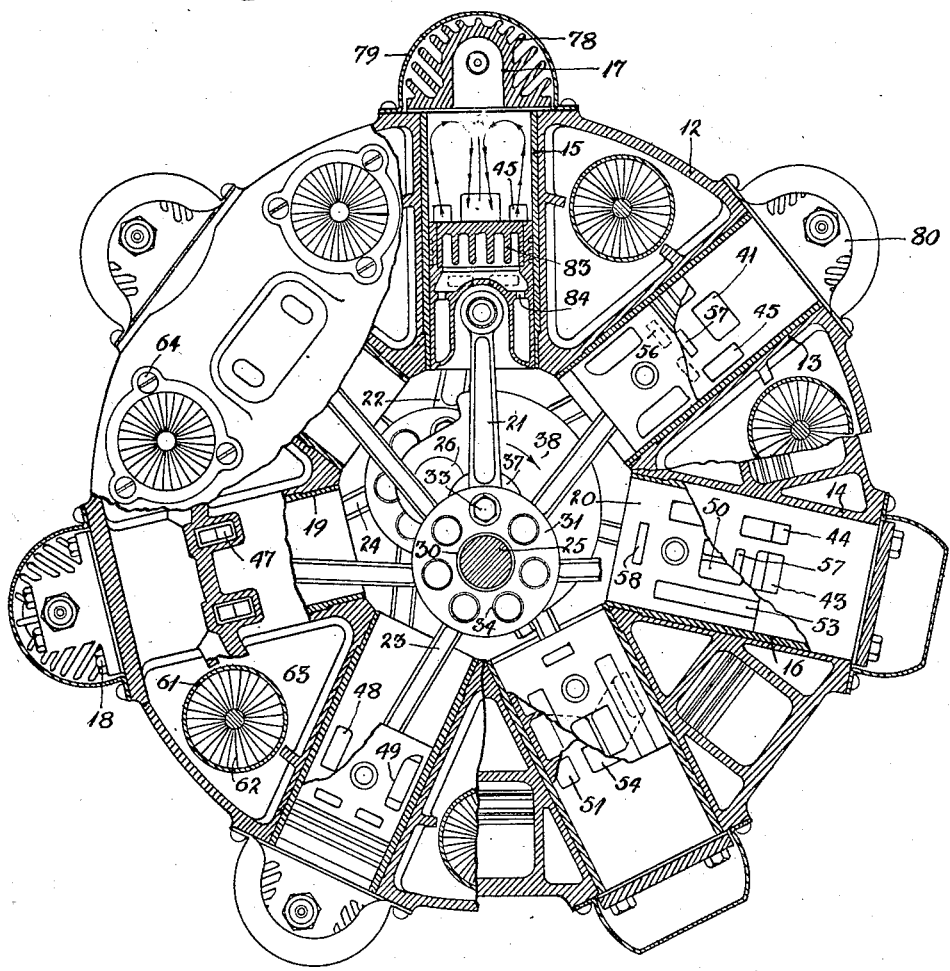
Fig. 2 is a partial cross section of the engine shown in Fig. 1, with portions cut away to show ports and ducts in the combustion and induction cylinders and pistons.
Figure 3:
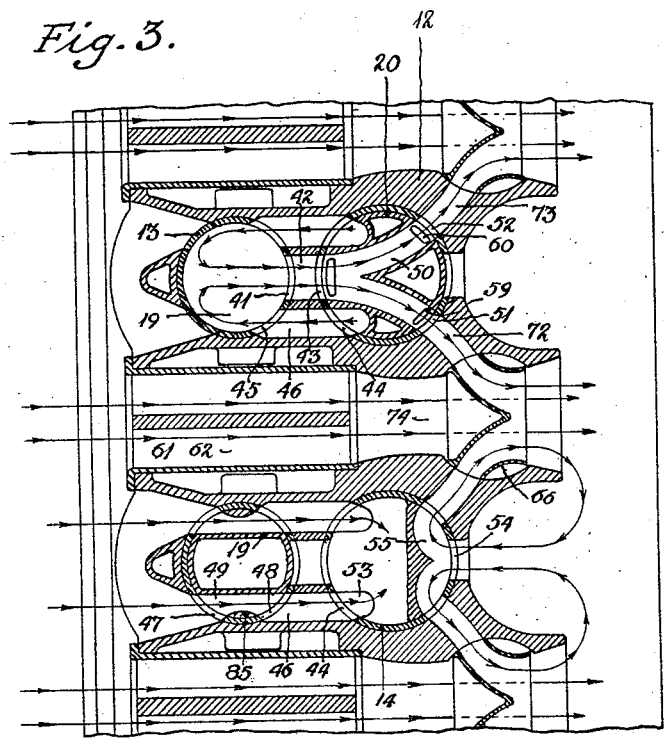
Fig. 3 is a developed sectional fragment through the cylinders, ducts and cooling elements showing the induction and exhaust streams and the cooling air streams.

Referring to the illustrated embodiment of my invention and particularly to Figures 1, 2 and 3, the numeral 12 designates an engine casing with which combustion cylinders 13 and inductions cylinders 14 are associated and preferably cast integral therewith to form a cylinder block. The combustion and induction cylinders are arranged axially adjacent to one another and form a plurality of angularly displaced pairs or units. In the present instance there are seven evenly spaced units arranged in a circle forming a strong and rigid cylinder block well suited for casting in one piece from aluminum or other light metal. Each combustion cylinder is provided with a liner 15 and each induction cylinder with a liner 16 press fitted within the cylinder bores and held in place by heads 17 bolted to the cylinder block by bolts 18. Each pair of cylinders is provided with a combustion piston 19 and an induction piston 20 respectively, connected by means of the master connecting rods 21, 22 and the auxiliary connecting rods 23, 24 to the angularly displaced cranks 25 and 26 respectively of the engine shaft 27, supported at one end by the bearing bracket 28, and at its other end by the bearing bracket 29 of special construction which will hereafter be more fully described. Each of the master connecting rods consists of a circumferentially unbroken bearing portion 30 extending the length of the crankpin journal and closely fitted within a bore in the central rod portion, and circumferentially unbroken end tie rings 31 and 32 closely fitted over the protruding ends of the bearing 30 and bolted together by means of the bolt 33 extending axially through the central rod. The end rings are provided with bearings 34 within which the journal bosses of the auxiliary rods are fitted and held in alignment by the bearing 30 and bolt 33. The crankshaft is also of special construction and consists of the end journal portions 35 and 36, each including a crankpin extending beyond the connecting rod bearing, a central plug 37 fitted within arcuate recesses in the crankpin extensions ground concentric with the shaft journals and a central clamp 38 having bores to receive the crankpin extensions and plug 37, and serving to align the journal portions 35, 36 and to firmly clamp them together by means of the bolts 39, 40.

From Fig. 12 it will be seen that the central clamp 38, the central plug 37 and the bolt 39 as well as the bolt 40, axially aligned with the bolt 39, form a central sub-assembly which, for the purpose of assembly with associated parts, is inserted into the circumferentially unbroken crankcase through one of its open ends together with the inner tie ring 32. The master rod 21 as well as the auxiliary rods 23, with their pistons attached may then be inserted through the outer open ends of the cylinders, the bearing bushing 30 of the master rod and the journal bosses on one side of the auxiliary rods being received by their respective bearings in the rings 32 by a slight lateral movement between the rods and the tie ring. The tie ring 31 may then be inserted through the open end of the crankcase and the rod assembly locked together by the bolt 33, the same procedure being followed with respect to the connecting rods associated with the crank 26. With this construction I am able to secure the advantages inherent in a cylinder block of unitary construction and at the same time secure the greater strength and rigidity that are characteristic of circumferentially unbroken elements for tying all connecting rods together. The special construction of the crankshaft and connecting rods is not claimed herein but forms the subject matter of Patent No. 2,237,685, dated April 8, 1941. It will be seen that all combustion pistons are connected to the crank 25, supplying the power take off shaft end 35 with a major power portion at a substantially uniform torque through the solid portion of the shaft and that the minor torque flowing through the clamp for driving the induction pistons and auxiliary devices, that may be connected to the shaft end 36, is also substantially constant, and that the stresses and torsional vibration on the shaft and particularly the clamp are thereby greatly reduced. The clamp 33 and the cranks, 25, 26 are formed to provide counterweights to suitably balance the crankpins, and the piston and rod assemblies.

Each pair of cylinders forms a substantially independently operable unit and the following description of one of the units is equally applicable to each of the other units. The combustion cylinder is provided with an exhaust port 41 adapted to be uncovered by the combustion piston 19 and connected through the exhaust transfer duct 42 with an exhaust port 43 in the induction cylinder. The induction cylinder is further provided with an induction port 44 connected with an induction port 45 in the combustion cylinder by means of the induction transfer duct 46. It will be seen that in Figs. 1, 2, 3 there are two induction ports in each cylinder and two induction transfer ducts arranged one on each side of the centrally positioned exhaust ports to facilitate rapid induction and in order to direct the fresh charge of working fluid to sweep the cylinder walls so as to cool them and crowd the burnt gases towards the center and out through the exhaust port, as shown by the arrows.

The combustion cylinder 19 is further provided with one or more auxiliary or inlet ports 47 on one side and with one or more auxiliary or outlet ports 48 arranged to be uncovered by or to register with ducts 49 in the skirt of the combustion piston 19 when said piston is in an outerly position, that is during a portion of the compression and combustion strokes, and to be covered or closed by the piston when in an innerly position that is during the period when the induction and exhaust ports 41 and 45 respectively are uncovered. It will be noted that the outlet ports 48 open into the induction transfer ducts 46 and in this instance are merely elongations of the induction ports 45. The induction piston 20 is provided with a duct 50 near its head which registers with the exhaust port 43 on one side of the cylinder and with the ports 51, 52 on the other side, when the induction piston is in an innerly position, and is further provided with a groove 53 for each induction port 44, positioned to register therewith and adapted to conduct the working fluid in and out of the induction cylinder. The induction cylinder is preferably provided with another port 54 and the induction piston with a transverse notch 55 connecting the port 54 with the ports 51, 52 when the induction piston is in an outerly position, providing a path for an auxiliary air stream, the purpose whereof will hereafter be described. The combustion piston 19 is also preferably provided with a bleeder notch 56 which connects the induction transfer duct 46 with a bleeder transfer duct 57 and serves to bleed the residue of partly compressed air remaining in the induction transfer ducts after the induction piston reaches the top of its stroke and the ports 41 and 45 have been covered by the combustion piston. This residue is conducted into and out of the exhaust duct 58 by means of the small ducts 58, 59 and 60 and expelled through the ports 51, 52.

Arranged between each pair of cylinders and extending through the cylinder block or casing, I provide cooling elements consisting of a tube 61 and a plurality of closely spaced cooling fins 62 preferably held in place by the central rod 63 and attached to the tube by some means such as hard soldering. One end of the tube is tightly fitted within bores in the casing and the other end is provided with a flange secured to the casing by screws 64 so as to seal the liquid coolant within the casing and serving to transfer heat from the cylinders to the cooling elements. The bracket 29 is shaped to form a pump housing and I provide an impeller 65 secured directly to the engine shaft which draws the cooling liquid from the passages formed by the cylinders and inner sides of the cooling elements and expells it into the passages formed by the cylinders and outer sides of the elements.

Figure 4:
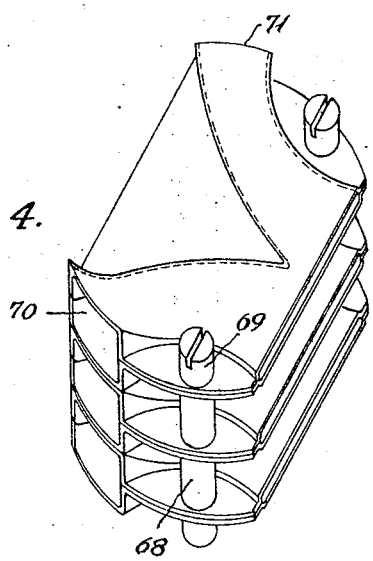
Fig. 4 shows the construction of the exhaust gas ejector for impelling the cooling air stream.

My invention also includes means for drawing streams of cooling air through the cooling elements impelled by the exhaust gas from the combustion cylinders and in the illustrated embodiment consists of an exhaust ejector or impeller 66 having arcuate sides fitted within bores in the casing and held in place by the plugs 67. A preferred form of ejector is shown in detail in Fig. 4 and consists of a plurality of shaped sheet metal plates, assembled with alternate plates reversed, spaced and held together by the spacers and screws 68 and 69. It will be seen that the plates form wide mouthed ducts 70, 71 at the left of the figure, which register with the ducts 72 and 73 in the casing for the passage of the exhaust gas. It is seen that the ducts 70, 71 are flattened and become narrow slits as they extend and meet at the right and form relatively wider intermediate ducts for the passage of an air stream. The ejector forms the exhaust gas into a plurality of narrow streams and interlinks these streams flatwise with a plurality of narrow cooling air streams and thereby establishes a partial vacuum in the air conduits 14 and draws a vigorous stream of cooling air through the elements 61. The arrows in the upper portion of Fig. 3 indicate the paths of the cooling air streams through the cooling elements and ejector and the paths of the exhaust gas through the induction piston and ejector as it is crowded out of the combustion cylinder by the incoming fresh charge from the induction cylinder during the period when the induction and exhaust ports in the combustion cylinder are both open. After the induction piston covers the port 43 the cooling air continues to flow but now tends to form a slight vacuum in the exhaust ducts of the ejector and to be impeded thereby. However during this period the induction piston moves into an outerly position, aligns the transverse notch 55 with the port 54 and with the ports 51, 52 and permits auxiliary air streams to flow through the exhaust ducts of the ejector as shown by the arrows in the lower part of Fig. 3 thereby reducing the impedance to the flow of cooling air through the ejector during this period; a fragment of the induction piston being cut away to show the path of the streams through the notch 55.

When liquid fuel is employed to operate the engine by injecting into the combustion chamber 75 by means of the injector 76 and igniting the charge with a spark plug 77 or by high compression, it is often desirable to maintain a relatively high temperature in the head and the combustion chamber, especially when operating with compression ignition. In my engine, I am able to maintain a high temperature in the head and thereby reduce the ignition lag and secure smoother operation and better efficiency especially when highly supercharged.

The absence of hot spots, usually caused by the presence of exhaust valves in the combustion chamber, permits the use of a higher degree of supercharge and compression when the engine is operated with spark ignition and results in more power or better efficiency. In order to secure the difference in temperature between the cylinder head and other portions of the engine, I provide each head with cooling fins 78 and a cover 79 having an inlet opening 80 and adapted to direct a separate stream of cooling air past the fins 78 and through the openings 81 into the general or mixing chamber 82 in which it joins the exhaust and air streams from the ejector 66 and is impelled by them. With this arrangement of separate streams for the heads, the liquid coolant in the casing need absorb the heat from the cylinders only and so is able to maintain a much lower cylinder temperature.

The cooperation between the pistons for the induction, transfer and exhaust of the working fluid will best be understood from the diagrams in Figures 5 to 10 inclusive showing the relative position of the pistons and the connections or passages which they establish at six different points of each cycle. In these diagrams, for the sake of clearness, the induction piston is shown in two parts; the part on the right side of the combustion cylinder showing the induction ports and passages, and the part on the left side showing the exhaust port and passages. Both ports of the induction piston, of course, move as one and their position is determined by the free crank in each figure. Since in the diagrams the shaft and cylinder planes do not coincide the connection between induction pistons and the free cranks has been omitted.

From the drawings it will be seen that the crank 26, to which the induction pistons are connected, leads the combustion or power crank 26 by 120 degrees. It should be understood however that the angular displacement between the cranks may be made less or even slightly greater than the displacement selected for illustration, depending to some extent on the relative positioning of the ports and ducts and on the particular characteristics desired, without departing from the spirit of my invention.

Figure 5:
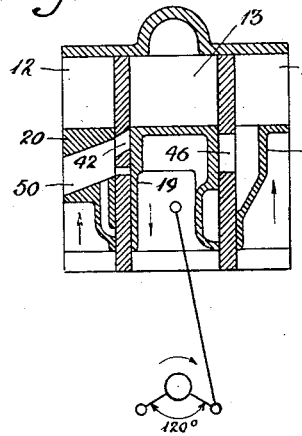
Figure 6:
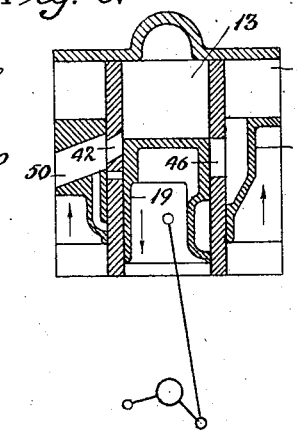
Figure 7:
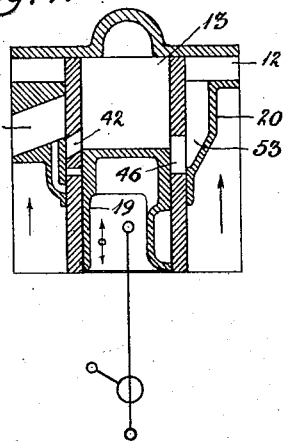

In Fig. 5, the induction piston 20 has commenced its compression stroke while the combustion piston 19 nears the end of its expansion stroke and is about to uncover the exhaust port and expel the burnt gases through the exhaust transfer duct 42 into the induction piston duct 50 and out through the ejector as heretofore described, but the induction transfer duct 46 is still closed and does not open until after the bulk of the exhaust gases have been expelled from the combustion cylinder, which stage is showing in Fig. 6 where the exhaust is partly open and the induction duct 46 is about to open and admit the partly compressed fresh charge from the induction cylinder 12. When the combustion piston reaches its most innerly position, that is bottom center shown in Fig. 7, the induction 20, moving outward, has just closed the exhaust transfer duct 50 and now prevents any further escape of the working fluid from the combustion cylinder even though the exhaust port in the combustion cylinder is still uncovered. However, the induction duct 46 remains open and the working fluid continues to flow into, and to supercharge, the combustion cylinder; the pressure in the induction cylinder increasing to whatever value is required to force the working fluid into the combustion cylinder. The increase in the induction pressure which I thus secure during the induction period makes efficient supercharging during high speed operation as well as during low speed operation possible to a degree not attainable with induction systems using a scavenging or induction compressor in which the pressure does not substantially vary during the induction period and in response to changes in the conditions of operation.

Figure 8:
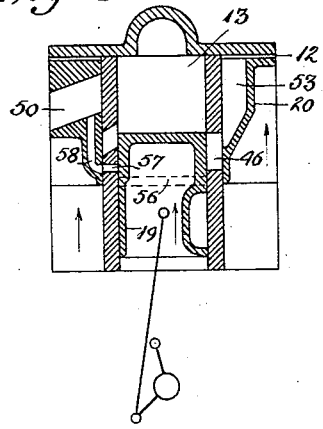

In Fig. 8, the piston 20 in the induction cylinder has substantially reached the end of its stroke, the working fluid has been transferred to the combustion cylinder and the induction duct 46 has just been closed by the combustion piston 19. As heretofore stated, a minor portion or residue remains in the transfer duct 46, groove 53 and clearance between cylinder head and the piston 20. A slight rotation of the shaft beyond the position shown in Fig. 8 causes the bleeder notch 56 in the combustion piston to register with the bleeder transfer duct 57, at this moment aligned with the bleeder duct 58, and to permit the escape of the compressed residue into the duct 50 and, through the small ducts 59 and 60 shown in Figs. 1 and 3, into the ejector 66. It should be noted that the provision for bleeding the residue is an auxiliary feature and that it may be dispensed with, particularly when the induction cylinders are supplied with a combustible mixture. When the bleeder feature is omitted the residue remains in the induction cylinders and mingles with the fresh charge as it is drawn in.

Figure 9:
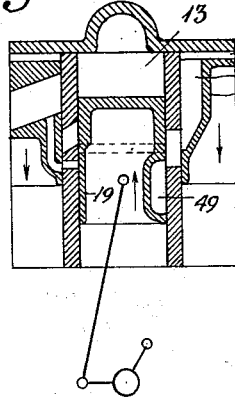
Figure 10:
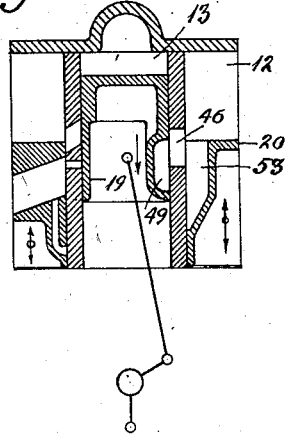

In Fig. 9, the induction piston 20 has commenced its downward or suction stroke and the duct 49 in the outwardly moving combustion piston 19 has begun to register with the inlet and outlet ports 47 and 48 in the combustion piston, shown in Figs. 2 and 3, and established a passage for the flow of working fluid or air into the induction cylinder. The flow into the induction cylinder continues during the entire suction stroke and the inlet and outlet ports 47 and 48 are not covered until after the induction piston 20 has passed bottom center, shown in Fig. 10, by about 15 degrees when the downwardly moving piston 19 covers them and further rotation of the crankshaft compresses the fresh charge and repeats the cycle hereinabove described. The path taken by the working fluid during the suction stroke of the induction piston is shown by the lower part of Fig. 3. The working fluid enters the interior of the combustion piston 19 thru the inlet ports 47, and through the induction transfer ducts 46 and grooves 53 reaches the interior of the induction cylinder. This arrangement serves not only to charge the induction cylinder but at the same time to cool the combustion piston; the effectiveness being further increased by the provision of the fins or pegs 83 on the inner surface of the piston head and the ducts 84 for sweeping the piston head with a portion of the working fluid. It will be understood that one side of the duct through the piston may be formed by the cylinder wall if the bridge 85 is omitted.

In the illustrated embodiment the displacement of the induction cylinders exceeds that of the combustion cylinders by forty per cent but this relationship may, of course, be changed depending on the maximum degree with which it is desired to charge the combustion cylinder, or the charge may be reduced or varied by throttling the inlet, in an obvious manner, not shown.

In Fig. 11, I have shown a modified form and arrangement of parts, ducts and ejector having but a single induction transfer duct 86 and an adjacent exhaust transfer duct 87, and a duct 88 in the induction piston for the exhaust gas which periodically registers with a centrally positioned port 89. The ejector, made up of plates 90 is similar to the one shown in Fig. 4, but differs therefrom in shape, and in that the wide mouthed openings are centrally arranged to register with the port 89, and in that the spacers 91 are arranged as shown in the figure to provide an unobstructed path for the flow of the air streams into the ejectors from its sides; the ejector being held within the arcuate bore in the casing by the retaining plates 92.

As heretofore stated each pair of cylinders, comprising a combustion cylinder, an induction cylinder and associated parts forms an independently operable unit. A single unit may be arranged to form an engine developing a power impulse per revolution, or a plurality of units may be employed and arranged in various ways, that will readily suggest themselves to those familiar with the art, to develop a plurality of evenly or unevenly spaced power impulses per revolution.

It should be noted that various changes may be made in the details of construction and combination of the various parts of my engine and one or more of the features disclosed herein may be used in the illustrated or other embodiments without departing from the spirit of my invention, and I desire to cover by my claims such changes and other embodiments which may reasonably be included within the scope of my invention.

I claim:

1. In an internal combustion engine, a combustion piston provided with a duct in its skirted portion adapted to conduct the engine working fluid, a combustion cylinder provided with an exhaust port adapted to be uncovered by the piston and further provided with an induction port also adapted to be uncovered by the piston but only after said piston has partly uncovered the exhaust port, an induction piston provided with a duct adapted to conduct the engine exhaust gas, an induction cylinder provided with an induction port and with an exhaust port adapted to be alternately covered and uncovered by the induction piston, an induction transfer duct connecting the inductions ports and an exhaust transfer duct connecting the exhaust ports in said cylinders, means for charging the induction cylinder through the duct in said combustion piston, means for exhausting the combustion cylinder through the duct in said induction piston, and means including a crankshaft for establishing relative movement between said pistons so that coverage of the exhaust port in the induction cylinder preceeds coverage of the induction port in the combustion cylinder.

2. In an internal combustion engine, an engine shaft having a plurality of angularly displaced cranks, a combustion cylinder having an induction port and an exhaust port and having a piston connected with one of said cranks and adapted to uncover said ports, an induction cylinder having an induction port and an exhaust port and having a piston connected with another crank and adapted to uncover one of said ports in the induction cylinder, an induction transfer duct between the cylinders connecting the induction ports, an exhaust transfer duct between the cylinders connecting the exhaust ports, means associated with the combustions cylinder and piston for charging the induction cylinder with working fluid, and means associated with the induction cylinder and piston for exhausting the combustion cylinder; said cranks, ports and means being positioned and arranged to exhaust the bulk of the burnt gases from the combustion cylinder, to partly compress the fresh charge in the induction cylinder and to admit the partly compressed charge into the combustion cylinder, to close the exhaust duct after a part of the fresh charge has been admitted to the combustion cylinder, to continue compression of the fresh charge in the induction cylinder and its transfer to the combustion cylinder, and to admit a fresh charge to the induction cylinder in the order named.

3. In an internal combustion engine, an engine shaft having a plurality of angularly displaced cranks, a combustion piston connected with one of said cranks, a combustion cylinder associated with said combustion piston provided with means for conducting working fluid into the engine, an induction piston connected to another crank, an induction cylinder associated with said induction piston provided with means including a duct in the induction piston for conducting working fluid out of the engine, a plurality of ports in the combustion cylinder adapted to be uncovered by the combustion piston, and a plurality of ports in the induction cylinder adapted to be uncovered by the induction piston; said cranks, ports, ducts and means being positioned and arranged to exhaust the working fluid from the combustion cylinder, to compress and transfer a portion of the working fluid from the induction cylinder to the combustion cylinder, to prevent the flow of working fluid out of the engine, to complete the transfer of the working fluid into the combustion cylinder, to conduct the compressed residue from the induction cylinder to the duct in the induction piston, and to admit a fresh charge of working fluid to the induction cylinder in the order named.

4. In an internal combustion engine developing an exhaust gas, an engine casing, a crankshaft associated with said casing, a pair of axially adjacent cylinders associated with said casing comprising a combustion cylinder and an induction cylinder provided with a combustion piston and an induction piston respectively and with means for transferring working fluid between the cylinders; means associated with said combustion cylinder and combustion piston for charging the induction cylinder with working fluid and for cooling the inner surface of the combustion piston with said working fluid, means including an air stream for cooling the outer surface of said cylinders, and means for impelling said air stream by said exhaust gas.

5. In an internal combustion engine developing an exhaust gas, an engine casing, a crankshaft associated with said casing, a pair of axially adjacent open ended cylinders associated with said casing comprising a combustion cylinder and an induction cylinder provided with a combustion piston and an induction piston respectively and with means for transferring working fluid between the cylinders and further provided with a cylinder head; means associated with said combustion cylinder and combustion piston for charging the induction cylinder with working fluid, means including an air stream for cooling the outer surface of said cylinders, means including a separate air stream for cooling said cylinder head, and means for impelling said air streams by said exhaust gas.

6. In an internal combustion engine, an engine casing, a crankshaft associated with said casing, a pair of axially adjacent cylinders associated with said casing comprising a combustion cylinder and an induction cylinder provided with a combustion piston and an induction piston respectively and with means for transferring working fluid between the cylinders, a liquid coolant within said casing adapted to cool said combustion cylinder, a cooling element associated with the casing adapted to conduct a stream of cooling air axially with respect to the casing and to transfer heat from said liquid coolant to said air stream, and means associated with said combustion cylinder and combustion piston for charging the induction cylinder with working fluid and for cooling the inner surface of the combustion piston with said working fluid.

7. In an internal combustion engine, an engine block shaped to form a crankcase and a plurality of pairs of angularly displaced open ended cylinders cast integral with said crankcase, each pair of cylinders including a combustion cylinder and an induction cylinder provided with a combustion piston and an induction piston respectively and with means for transferring working fluid between the cylinders and further provided with removable means for closing the outer ends of said cylinders, a crankshaft having a crank connected with said combustion piston in each pair, and having an angularly displaced second crank connected with said induction piston in each pair, a liquid coolant within the engine block adapted to cool said combustion cylinders, a plurality of cooling elements associated with the engine block and adapted to conduct a plurality of axial streams of cooling air and to transfer heat from said liquid coolant to said air streams, and an impeller on said crankshaft adapted to impell the liquid coolant past the cylinders and the cooling elements.

8. In an internal combustion engine, an engine block shaped to form a crankcase and a plurality of pairs of angularly displaced axially adjacent cylinders cast integral with said crankcase, each pair of cylinders including an open ended combustion cylinder and an open ended induction cylinder provided with a combustion piston and an induction piston respectively and with means associated with said engine block for transferring working fluid between the cylinders and further provided with removable means for closing the outer ends of said cylinders; and an assembled crankshaft having a solid portion including a power take off and a power crank connected with said combustion piston in each pair for the transfer of a major power portion from said power crank to the power take off through said solid portion and having a second crank connected with the induction piston in each pair receiving a minor power portion from said power crank through the assembled portion of said crankshaft.

9. In an internal combustion engine having a cylinder developing an exhaust gas, a cooling system for said engine including a cooling element adapted to be cooled by an air stream, a liquid coolant adapted to transfer heat from the cylinder to said cooling element, and means for impelling said cooling air stream by said exhaust gas, said means including an ejector having a series of narrow ducts arranged flatwise side by side adapted to form the air stream into a series of flat streams and being further adapted to form the exhaust gas into a series of flat streams alternating flatwise with said air streams.

10. In an internal combustion engine and a cooling system associated therewith, an engine casing, a cylinder associated with said casing adapted to develop an exhaust gas, a liquid coolant within said casing adapted to cool said cylinder, a cooling element associated with said casing and liquid coolant adapted to be cooled by an air stream and to transfer heat from said liquid coolant to said air stream and means for impelling said cooling air stream by said exhaust gas including an ejector having a series of narrow flatwise adjacent ducts and adapted to eject said cooling air from alternate ducts and to eject said exhaust gas from intermediate ducts.

11. In an internal combustion engine developing an exhaust gas, the means for cooling the engine with an air stream and for impelling said air stream by said exhaust gas including an ejector comprising a housing having a passage for said cooling air stream and a passage for said exhaust gas and provided with a plurality of plates forming a series of narrow flatwise adjacent ducts, said housing and plates being adapted to conduct said cooling air stream through alternate ducts forming thin streams and to conduct said exhaust gas through intermediate ducts likewise forming thin streams acting flatwise on said cooling air streams.

12. In an internal combustion engine developing an exhaust gas, the means for cooling the engine with an air stream and for impelling said air stream by said exhaust gas including an ejector comprising a housing having an arcuate portion and having a passage for the cooling air stream and a passage for said exhaust gas opening into said arcuate portion adjacent to one another and a plurality of plates associated with said housing forming a series of narrow flatwise adjacent ducts, said housing and plates being adapted to conduct said cooling air through alternate ducts, thereby forming thin streams and to conduct said exhaust gas through intermediate ducts likewise forming thin streams acting flatwise on said cooling air streams.

13. In an internal combustion engine developing an exhaust gas, the means for cooling the engine with an air stream and for impelling said air stream by said exhaust gas including an ejector comprising a housing provided on one of its sides with a passage for said exhaust gas and an adjacent but separate passage for said cooling air and provided on its other side with a joint passage for the exhaust gas and the cooling air and further provided with a cylindrical space communicating with said passages, and a plurality of plates fitted within said cylindrical space forming a series of narrow flatwise adjacent ducts connecting the separate passages with the joint pasage, said housing and plates being adapted to conduct said cooling air through alternate ducts and to conduct said exhaust gas through intermediate ducts acting flatwise on said cooling air streams as they flow into the joint passage.

14. In an internal combustion engine: a unitary engine block forming a circumferentially unbroken open ended crankcase having cylinders arranged about its outer periphery provided with removable closures at their outer ends; pistons in said cylinders; an assembled master connecting rod comprising a central rod portion having a small end connected with one of said pistons and a big end provided with a circumferentially unbroken bearing portion adapted to be received by the crankcase through the cylinder and further comprising a pair of circumferentially unbroken end tie rings joined with said bearing portion forming therewith a master piston assembly; a plurality of auxiliary connecting rods, each being connected with a piston to form therewith an auxiliary piston assembly provided with means operatively connecting it with said tie rings; and a crankshaft having a free ended crankpin adapted to be received by said master rod by lateral insertion of the crankshaft into the crankcase.

ALFONS H. NEULAND.